United States Patent
Itani et al.

(10) Patent No.: US 9,678,723 B2
(45) Date of Patent: Jun. 13, 2017

(54) APPLICATION PROGRAMMING INTERFACE (API) ENGINE

(71) Applicant: Verizon Patent and Licensing Inc., Arlington, VA (US)

(72) Inventors: Abdul Itani, Lebanon, NJ (US); Patrick John Gartner, Monroe, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 14/464,045

(22) Filed: Aug. 20, 2014

(65) Prior Publication Data

US 2016/0054982 A1 Feb. 25, 2016

(51) Int. Cl.
*G06F 17/30* (2006.01)
*G06F 9/44* (2006.01)

(52) U.S. Cl.
CPC ............... *G06F 8/34* (2013.01); *G06F 8/20* (2013.01); *G06F 8/36* (2013.01)

(58) Field of Classification Search
CPC ..... G06F 8/20; G06F 8/34; G06F 8/38; G06F 8/30; G06F 9/4443; G06F 9/4425; G06F 11/3636; G05B 19/0426; G05B 2219/23258; G05B 2219/25067; G05B 2219/25086; Y10S 707/99943; Y10S 707/99944

See application file for complete search history.

(56) References Cited

U.S. PATENT DOCUMENTS

| 2002/0196283 | A1* | 12/2002 | Petruk | G06F 8/34 715/763 |
| 2003/0030655 | A1* | 2/2003 | Ooe | G09G 3/2944 345/690 |
| 2004/0056896 | A1* | 3/2004 | Doblmayr | G06F 3/0486 715/769 |
| 2004/0103389 | A1* | 5/2004 | Song | G06F 8/51 717/107 |
| 2006/0052884 | A1* | 3/2006 | Staples | G05B 19/0426 700/83 |
| 2006/0111888 | A1* | 5/2006 | Hiew | G06F 8/34 703/22 |

(Continued)

FOREIGN PATENT DOCUMENTS

| DE | WO 2004072849 A1 * | 8/2004 | G06F 8/34 |
| EP | 1872209 B1 * | 3/2016 | G06F 8/34 |

*Primary Examiner* — Augustine K Obisesan

(57) ABSTRACT

Systems and methods for an application programming interface (API) engine are disclosed. Some implementations include receiving, via a user interface, a selection of a first graphical element representing a first component of an API that is to be generated, where the first component is associated with a first set of one or more reusable programming actions, receiving, via the user interface, instructions to drag the selected first graphical element and another selected second graphical element to a graphical workspace associated with the user interface to connect the first and the second graphical element, combining the first set of reusable programming actions with a second set of reusable programming actions when the selected second graphical element is connected with the first graphical component on the graphical workspace and automatically displaying software code representing the API based on the combination.

20 Claims, 12 Drawing Sheets

(56) References Cited

U.S. PATENT DOCUMENTS

| | | | |
|---|---|---|---|
| 2008/0244510 A1* | 10/2008 | Cote | G06F 8/24 |
| | | | 717/108 |
| 2009/0113384 A1* | 4/2009 | Kosov | G06Q 10/00 |
| | | | 717/105 |
| 2011/0088012 A1* | 4/2011 | Huin | G06F 8/34 |
| | | | 717/109 |
| 2012/0030655 A1* | 2/2012 | de Castillo | G06F 8/51 |
| | | | 717/125 |
| 2014/0149961 A1* | 5/2014 | Falk | G06F 8/315 |
| | | | 717/105 |

* cited by examiner

APPLICATION PROGRAMMING INTERFACE (API) ENGINE

BACKGROUND

In computer programming, an Application Programming Interface (API) can specify how some software components should interact with each other. In practice, many times an API comes in the form of a library that includes specifications for routines, data structures, object classes, and variables.

Mean time for creation of a traditional API has a level of effort that can be, for example, from twenty to thirty days of development hours. Complexity associated with scope of such work can increase or decrease a developer's level of effort and software development cycles can take weeks. Furthermore, a software development cycle rarely has reusable software code, which results in a software developer rewriting a derivative API of an existing API. However, given today's highly competitive markets, a software development often needs to be completed in just a few days. In addition, speed to market within a development cycle must have a high level of integrity to ensure a consistently good customer experience.

As the foregoing illustrates, a new approach for API development may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to an innovative API development framework. In some implementations, the API development framework provides drag and drop functionality via a user interface to systematically generate an API. For example, a user may select a first graphical element representing a first component of an API that is to be generated, where the first component is associated with a first set of one or more reusable programming actions. The user may then drag the selected first graphical element and another selected second graphical element to a graphical workspace associated with the user interface to connect the first and the second graphical element. The graphical connection combines the first set of reusable programming actions with a second set of reusable programming actions. Then software code representing the API based on the combination is automatically displayed at the user interface. The software code of the API may be selected and embedded by the user (e.g., software developer) into another software application that may need functionality provided by the API. In contrast to approaches that may provide "drag and drop" software code entry where software code may be generated after selecting visual interface modules, the disclosed implementations are able to combine different sets of reusable programming actions (e.g., the first set of reusable programming actions with the second set of reusable programming actions).

In this way, different programming actions that are represented by respective graphical elements can be easily combined together by a user to generate an API with desired functionality. This reduces time for generating an API, and allows inclusion of a complete API into a software development cycle in a short period of time (e.g., a few hours or days) with a high level of integrity. The disclosed implementations improve speed to market (or customer use) and ensure business rule consistency and coding consistency for API clients.

Reference now is made in detail to the examples illustrated in the accompanying drawings and discussed below.

Figure 1:
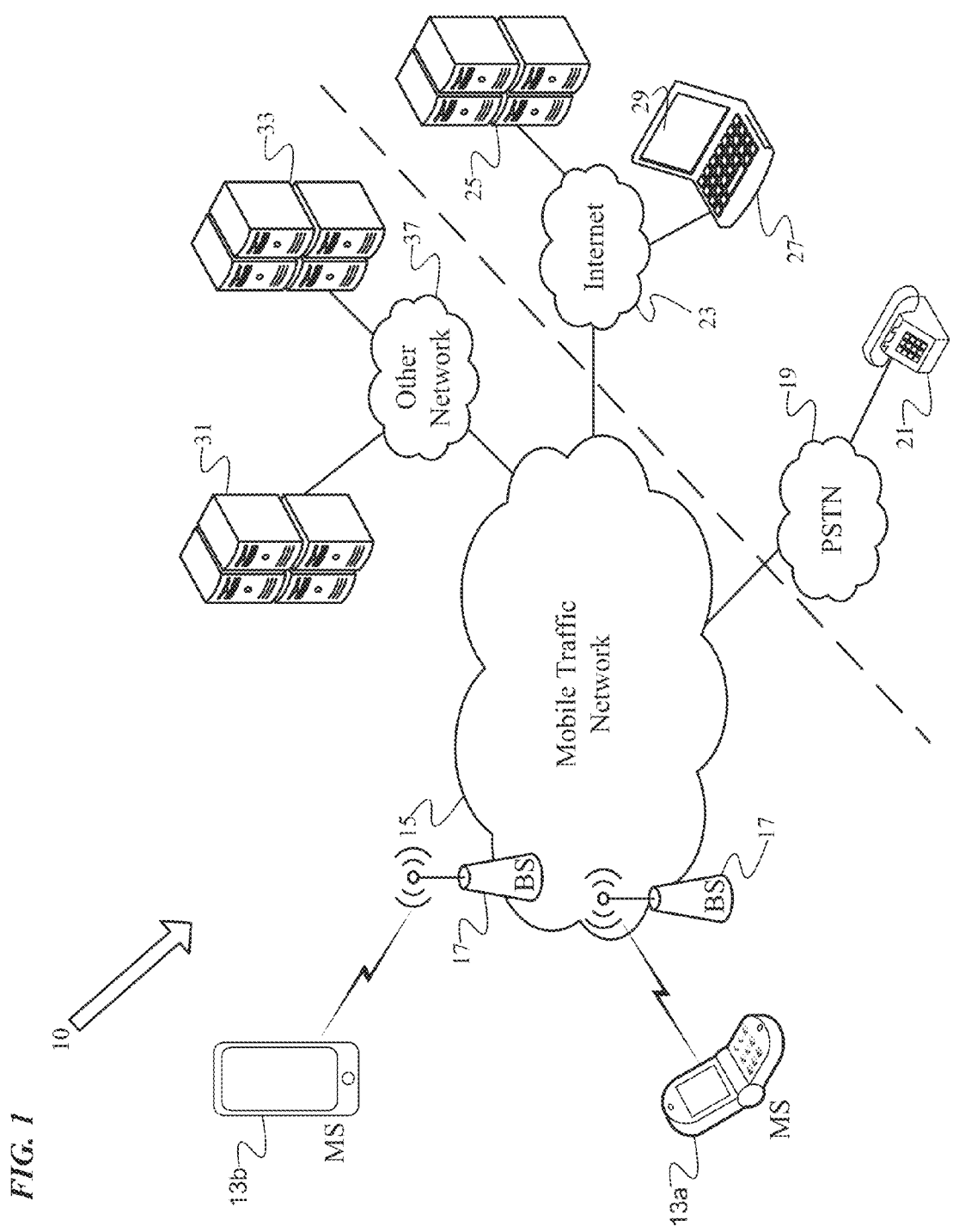
FIG. 1 illustrates a high-level functional block diagram of an exemplary system of networks/devices that provide various communications for mobile stations and support an implementation of the API development service.

FIG. 1 illustrates a system 10 in which the disclosed implementations may be implemented. The example shows simply two mobile stations (MSs) 13a and 13b as well as a mobile communication network 15. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Long Term Evolution (LTE) standard, the Global System for Mobile (GSM) communication standard, a time division multiple access (TDMA) standard or other standards used for public mobile wireless communications. The mobile stations 13a and 13b may are capable of voice telephone communications through the network 15 and data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a computing device 27 as well as a server 25 connected to the Internet 23; and the data services for the mobile stations 13a and 13b via the Internet 23 may be with devices like those shown at 25 and 27 as well as with a variety of other types of devices or systems capable of data communications through various interconnected networks. The mobile stations 13a and 13 (or any other mobile or non-mobile computing devices) of users of the API development framework also can receive and execute applications written in various programming languages, as discussed more later. In some implementations, the computing device 27 provides a graphical user interface that allows a user to interact with functions provided by API engine 25. The API engine 25 is discussed further below.

Mobile stations 13a and 13b and computing device 27 can take the form of portable handsets, smart-phones or personal digital assistants, although they may be implemented in other form factors. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serves mobile stations 13a and 13b, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13a and 13b, when the mobile stations 13a and 13b are within range. Each base station can include a BTS coupled to several antennae mounted on a radio tower within a coverage area often referred to as a "cell." The BTS is the part of the radio network that sends and receives RF signals to/from the mobile stations 13a and 13b that are served by the base station 17.

The radio access networks can also include a traffic network represented generally by the cloud at 15, which carries the user communications and data for the mobile stations 13a and 13b between the base stations 17 and other elements with or through which the mobile stations 13a and 13b communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 37 (sometimes referred to as an Intranet), i.e., a private networks. Generally, such systems are part of or connected for communication via the private network 37. A person skilled in the art, however, would recognize that systems outside of the private network could serve the same functions as well. Examples of such systems, in this case operated by the network service provider as part of the overall network 10, which communicate through the intranet type network 37, include one or more application servers 31 and a related authentication server 33 for the application service of server 31. A mobile station 13 communicates over the air with a base station 17 and through the traffic network 15 for various voice and data communications, e.g. through the Internet 23 with a server 25 and/or with application servers 31.

Servers such as 25 and 31 may provide any of a variety of common application or service functions in support of or in addition to an application program running on the mobile station 13. However, for purposes of further discussion, we will focus on functions thereof in support of the API development framework. For a given service, including the API development framework, an application program within the mobile station may be considered as a 'client' and the programming at 25 or 31 may be considered as the 'server' application for the particular service.

As shown by the above discussion, functions relating to the API development framework, via a graphical user interface of computing device 27 (or mobile stations 13a or 13b), may be implemented on computers connected for data communication via the components of a packet data network, operating as an API engine 25 as shown in FIG. 1. Although special purpose devices may be used, such devices also may be implemented using one or more hardware platforms intended to represent a general class of data processing device commonly used to run "server" programming so as to implement the API development framework discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the API development framework that includes the API engine 25. The software code is executable by the general-purpose computer that functions as the API engine 25 and/or that functions as computing device 27 and/or mobile station 13a or 13b. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the API development framework, in essentially the manner performed in the implementations discussed and illustrated herein.

Figure 2:
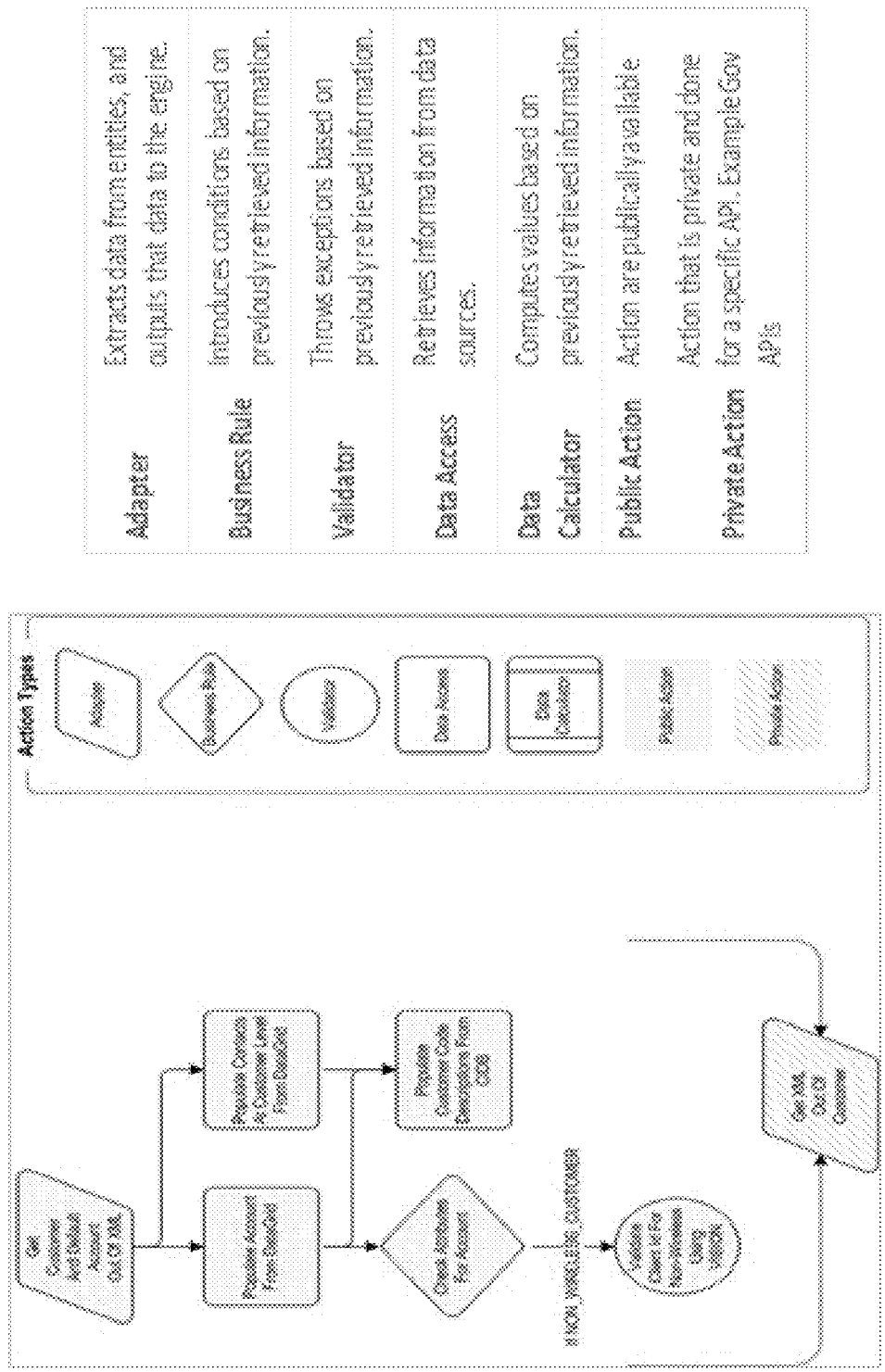
FIG. 2 illustrates exemplary graphical elements that may be used as components of the API that is to be generated.

In some implementations, a user interface 29 displayed at the computing device 27 receives a selection of a first graphical element representing a first component of an API that is to be generated. The first component can be associated with a first set of one or more reusable programming actions. FIG. 2 illustrates example graphical elements that may be used as the first (or other components) of the API that is to be generated. Different programming action types represented as graphical user elements include, but are not limited to, adapter, business rule, validator, data access, data calculator, public action, private action, etc. Each graphical action element can represent a first component of an API that is to be generated.

In some implementations, the adapter action element extracts data from entities and outputs the data to the API engine 25. The business rule action element can introduce conditions based on previously retrieved information. The validator action element can generate exceptions based on previously retrieved information. The data access action element can retrieve information from one or more data sources. The data calculator action element can compute values based on retrieved information. The public action can be an action element that is publicly available (or not private). The private action element can be an action that is private and is specific to a particular API (e.g., government APIs). As shown in FIG. 2, these action elements can be represented as graphical elements.

The user interface 29 allows a user (e.g., API developer) to drag the selected first graphical element to a graphical workspace associated with the user interface 29. For example, with reference to FIG. 2, a user may select the adapter, "Get Customer and Default Account" from a toolbar and drag it to the graphical workspace on the user interface 29.

The user may then select a second graphical element representing a second component of the API, where the second component is associated with a second set of one or more reusable programming actions. For example, a user may select data access action element, "Populate Account from Data Grid" from a toolbar and drag the data access action element to connect with the adapter, "Get Customer and Default Account" on the graphical workspace. The user may then select a third graphical element representing a third component of the API, where the third component is associated with a third set of one or more reusable programming actions. For example, a user may select data access action element, "Populate Contacts At Customer Level From Data Grid" from a toolbar and drag the data access action element to connect with the adapter, "Get Customer and Default Account" on the graphical workspace. The user may connect the dragged elements onto the graphical workspace by using one or more connectors (e.g., lines with arrows). In this way, connections between the different graphical workspace components may be established. In some implementations, the shape and color of the elements may differ based on functions associated with the elements. The shape (e.g., square, rectangle, circle, etc.) and color (e.g., a color from a color palette) of the elements may also be changed by the user in accordance with the user's preference. Connections may be setup by connecting the action elements using "arrow" connectors. The arrows may be directional and may specify a direction of dataflow between the elements. Connections may also be established by highlighting one or more elements and selecting a connect action button that automatically may generate connections between the selected elements. Connectors may connect elements in parallel or in any sequence.

As shown in FIG. 2, the action elements "Populate Account from Data Grid" and "Populate Contacts At Customer Level From Data Grid" are connected in parallel with the "Get Customer and Default Account" action element. In this way, the second set of one or more reusable programming actions can be performed in parallel with the third set of one or more reusable programming actions. In a manner similar to that has been discussed above, the user may drag and connect other action elements such as "Check Attributes For Accounts" and "Populate Customer Code Descriptors" and connect them to the parent action elements "Populate Account from Data Grid" and "Populate Contacts At Customer Level From Data Grid." The user may then place a validator action "Validate Client ID For Non-Wireless Customers" and connect the validator action to the action element "Check Attributes For Accounts." The user may add other action elements, such as, a private action element "Get XML Out of Customer."

Figure 4:
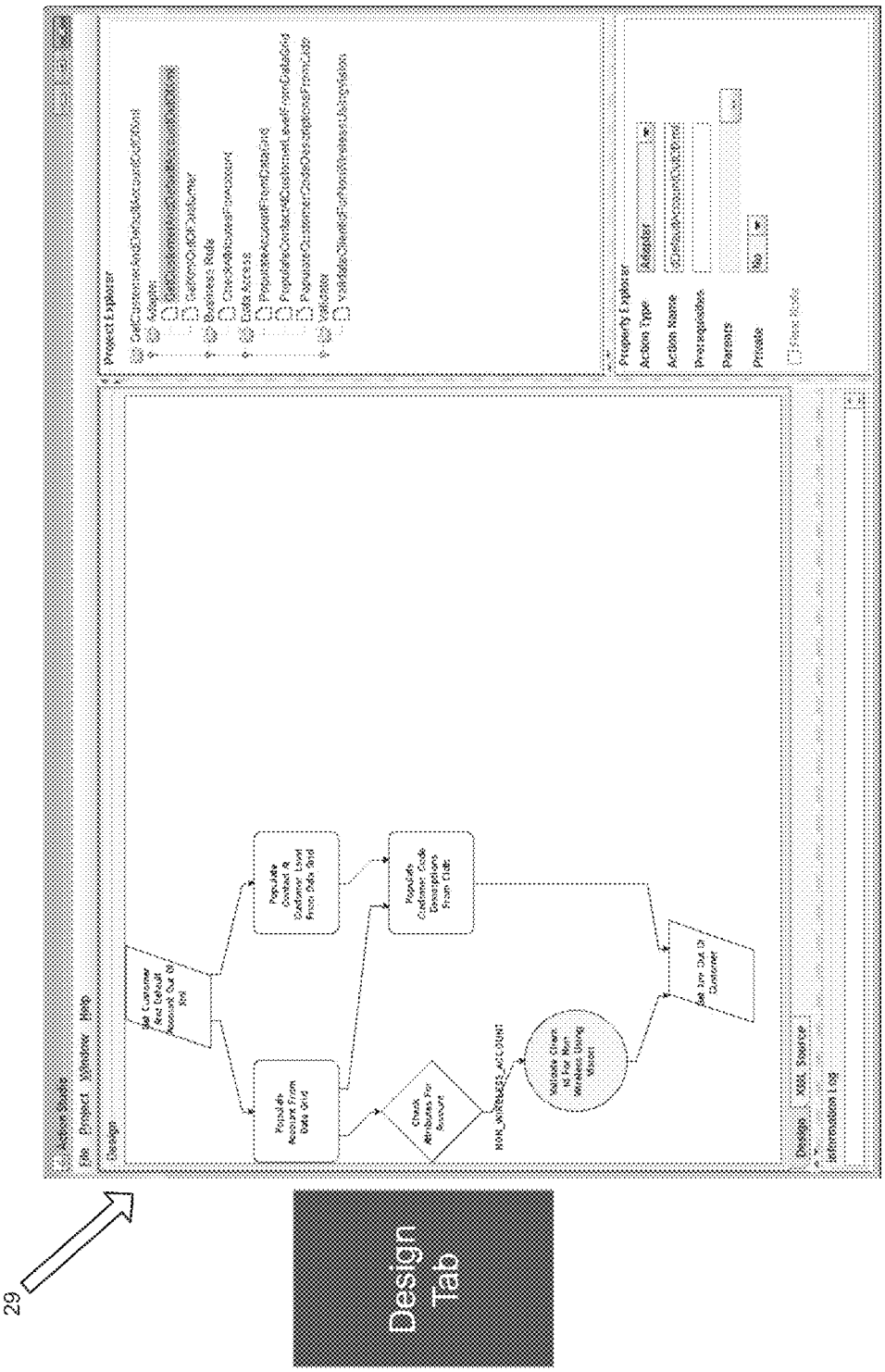
FIG. 4 illustrates an exemplary graphical workspace as a design tab interface in an API project.
Figure 5:
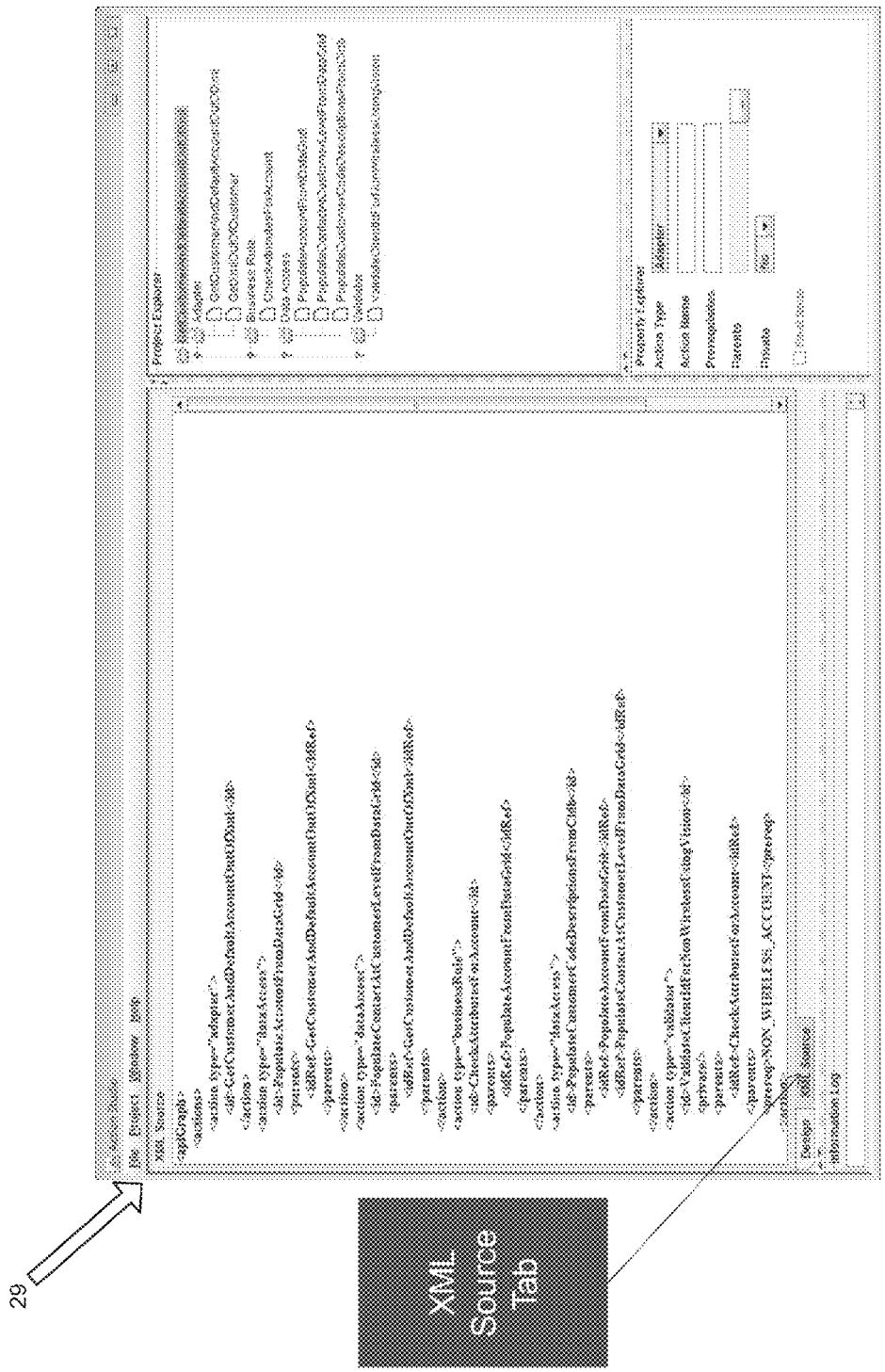
FIG. 5 illustrates an exemplary graphical workspace as an Extensible Markup Language (XML) source tab interface in an API project.

As the user drags and connects the different graphical action elements, the API engine 25 combines respective reusable programming actions associated with the action elements. For example, the API engine 25 combines the first set of reusable programming actions with the second set of reusable programming actions when the selected second graphical element is connected with the first graphical component on the graphical workspace. Upon the combining, the API engine automatically displays software code representing the API. The software code can be embedded in the other software applications to perform the reusable programming actions as a single API. An example of the graphical workspace is illustrated in FIG. 4. In some implementations, the graphical workspace is included within the user interface 29 and can be represented as a "Design Tab" that includes the connected graphical elements of FIG. 2. In some implementations, as shown in FIG. 5, the graphical workspace is included within the user interface 29 and can be represented as a "XML Tab." The XML Tab can display software code generated by the API engine 25.

In some implementations, the API engine 25 generates an action dependency graph representing the combined first set of reusable programming actions and the second set of reusable programming actions. The API engine 25 then transforms extensible markup language (XML) of the action dependency graph into an action graph object and iterates through each action in the action graph object to build dependencies (or pre-requisites). As an illustrative example, an action graph or object graph can be a view of API objects at a particular point in time. Action graph objects may be linked to each other by one object either owning or containing another object or holding a reference to another object. This web of objects can be called an action graph.

Dependencies may include, but are not limited to, a fully qualified action class name from a particular action's name, the particular action's children and the particular action's parents. In some implementations, a dependency graph listing all dependencies may be built at startup. In some implementations, the API engine 25 may reject the action dependency graph at startup when it is determined that the graph is invalid (e.g., a syntax error in Extensible Markup Language (XML) source code. Any action graphs that are not written in accordance with a predetermined syntax (or semantics) or contain ambiguities may be determined to be invalid. The ambiguities may include, but are not limited to, one or more of inability to locate a class matching a fully qualified class name assembled from the action dependency graph, inclusion of identifiers in the action dependency graph that deviate from configured naming conventions or a parentless action in the action dependency graph.

In some implementations, the API engine 25 parses graphical components (e.g., select data access action element, "Populate Account from Data Grid") representing respective sets of reusable programming actions as a dependency graph of actions. The API engine 25 then executes the actions starting with actions that have no dependencies, until all actions are complete or a fatal error occurs. A dependency graph is a directed graph representing dependencies of several objects towards each other. It is possible to derive an evaluation order or the absence of an evaluation order that respects the given dependencies from the dependency graph.

In some implementations, the API engine 25 can store information about the status and data shared between different sets of reusable programming actions. For example, the API engine 25 can store status and data shared between data access action element, "Populate Account from Data Grid" from a toolbar and the adapter, "Get Customer and Default Account" that is connected to the data access action element. In some implementations, the API engine 25 can allow a graphical component representing a set of reusable programming actions to reference another graphical component representing another of reusable programming actions.

In some implementations, the API engine 25 can introduce one or more conditions via the first set of reusable programming actions or the second set of reusable programming actions, wherein the conditions include flags that can be used at runtime to determine if an action is eligible for execution. The flags may be checked by the API action engine 25 while traversing API action graphs to determine whether to further traverse an action graph. In some aspects, a flag may act as a conditional check to determine whether a condition at a point in the graph is satisfied. If the condition is satisfied, the graph may be further traversed. However, if the condition is not satisfied, the graph may not be further traversed. For example, while traversing the action graph if a flag indicates that the action graph should not be traversed further, the traversal of the action graph by the API action engine 25 may be suspended. This can save computing resources of the API action engine 25.

In some implementations, the API engine 25 can add the first graphical element and the second graphical element to the graphical workspace with a service name as a key. The key can be a name or any identifier of an API. The key may be a part of an XML file associated with the API. In some implementations, the name of the XML file associated with the API is identical to the name of the API or key.

The API engine 25 can provide a copy of a parent connection map to each action in the combined first set of reusable programming actions and the second set of reusable programming actions. In some implementations, when n actions have the same parent, the API engine 25 can create n−1 copies of connections to the parent so that each action can have a separate parent connection map. In some implementations, the API engine 25 can, when an action has multiple parents, combine connection maps from the multiple parents into one map.

Figure 3:
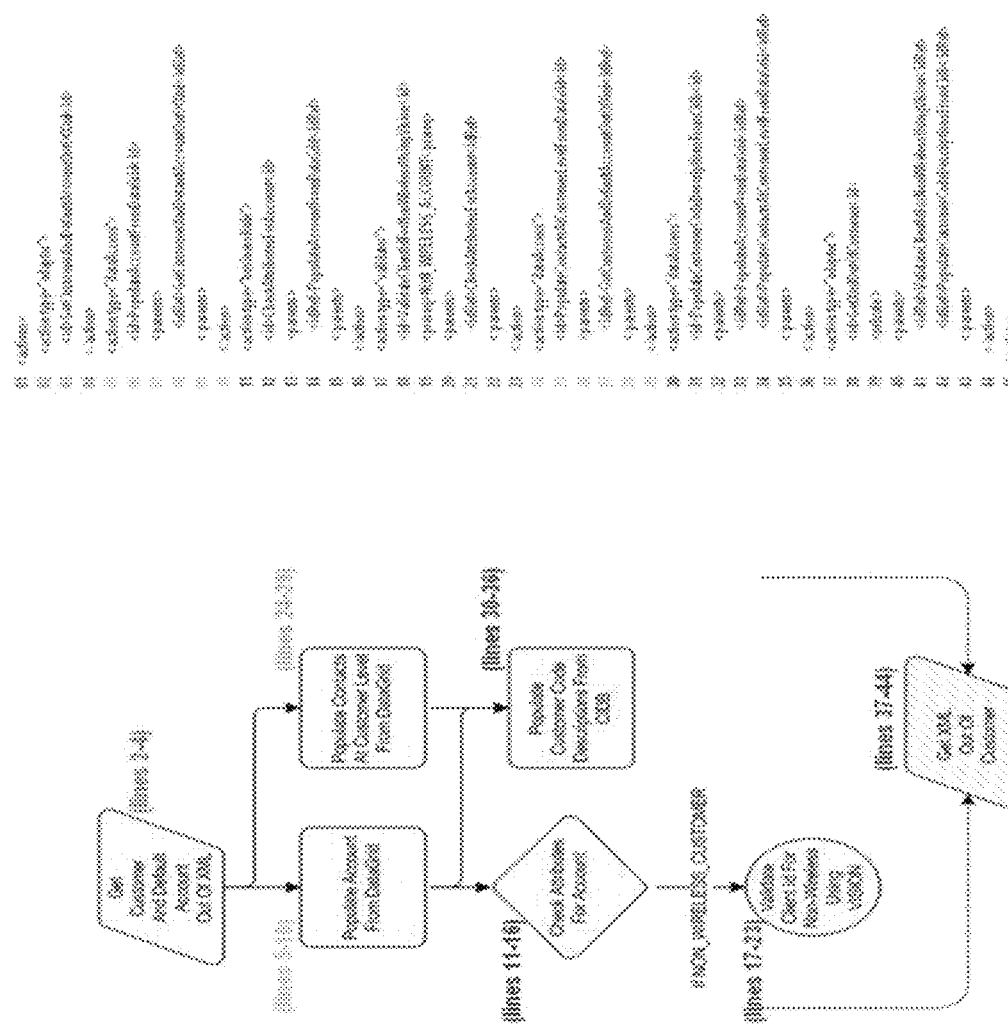
FIG. 3 illustrates exemplary software code that is displayed by an API engine at a user interface.

FIG. 3 displays an exemplary software code 300 that is displayed by the API engine 25 at the user interface 29 based on the action element connection of FIG. 2. As shown in FIG. 3, lines 2-4 of the code are associated with the "Get Customer and Default Account" action element. Similarly, lines 5-10 of the code are associated with the "Populate Account from Data Grid" action element. As described above, the API engine 25 combines respective reusable programming actions associated with these (and other) action elements and automatically displays software code 300 representing the API. In some implementations, displayed color of software code 300 may automatically update with the displayed color or shape of the action object. As the shape or color of the action object changes, the displayed color of its respective software code is automatically updated in real-time. This improves user experience of a person writing the software code 300.

Figure 10:
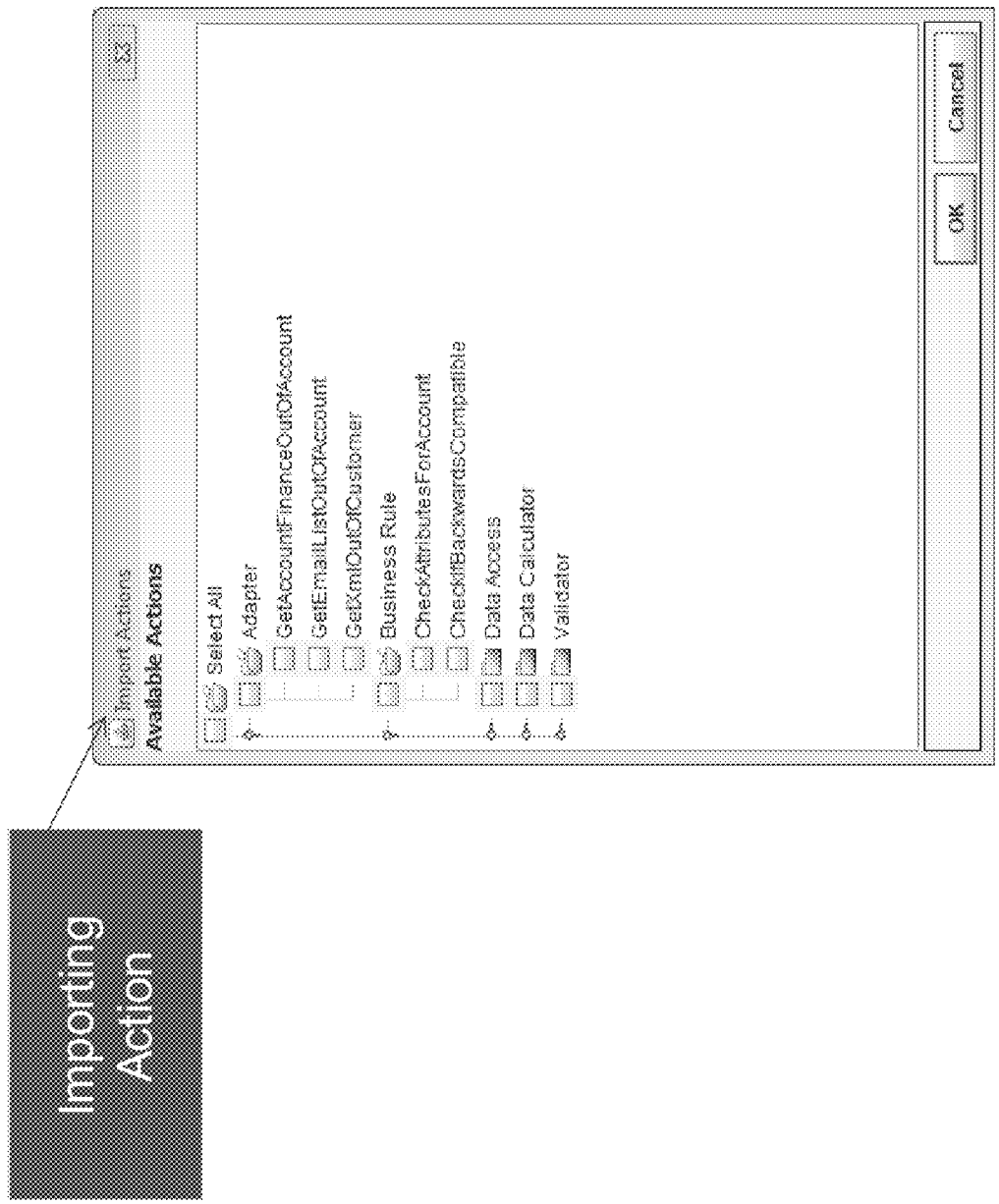
FIG. 10 illustrates an exemplary operation to import an action into an API project.
Figure 11:
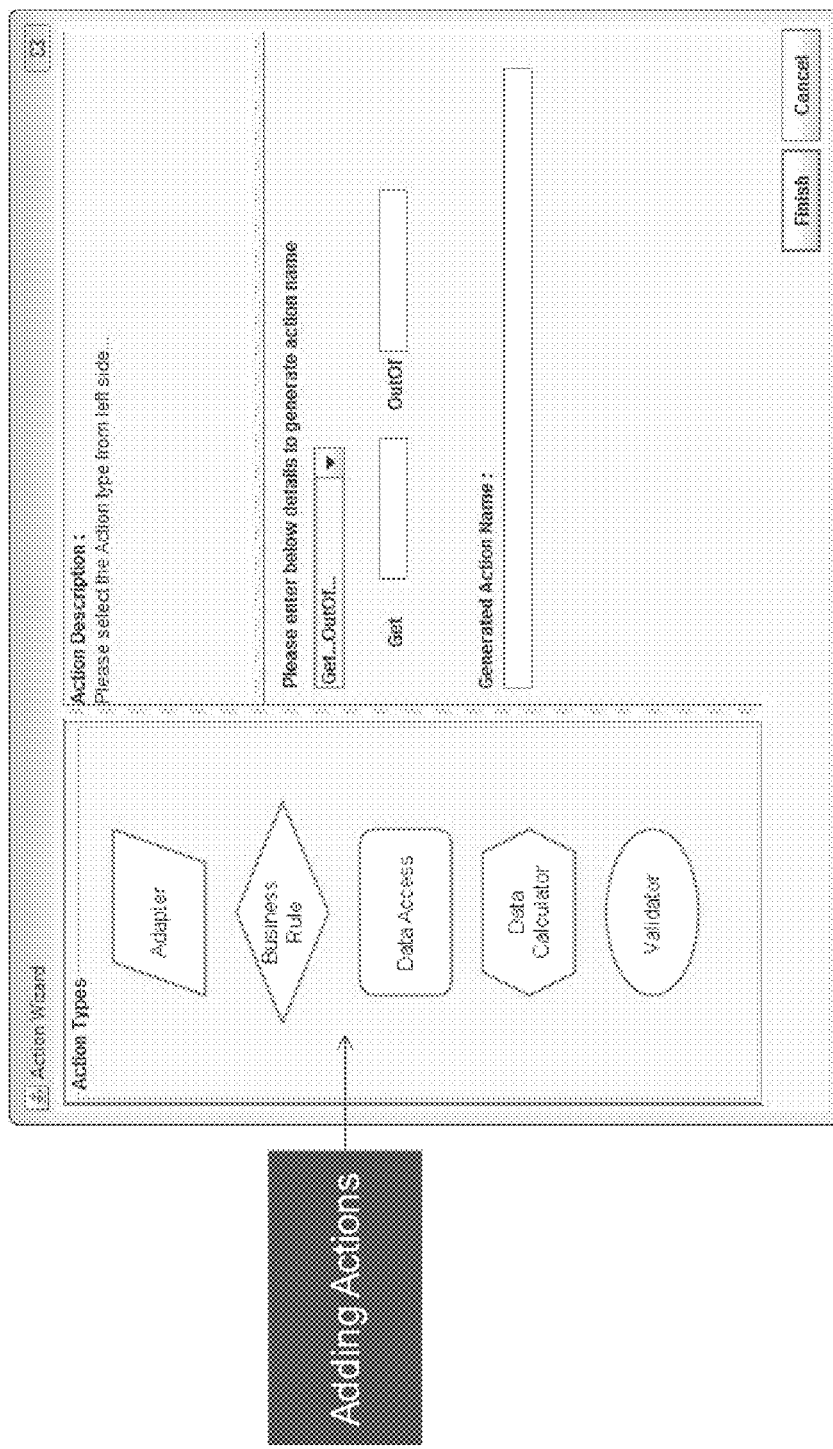
FIG. 11 illustrates an exemplary operation to add actions into an API project.

Referring to FIGS. 10 and 11, the software code can be embedded in the other software applications to perform the reusable programming actions as a single API. Thus, a software developer need not manually type the software code 300. Instead, the software developer can easily develop an API by connecting reusable graphical action elements on a graphical workspace. This reduces time for generating an API, and allows placing of an API into production from weeks to days with a high level of integrity. The disclosed implementations provide speed to market and ensure business rule consistency and coding consistency for API clients.

Figure 6:
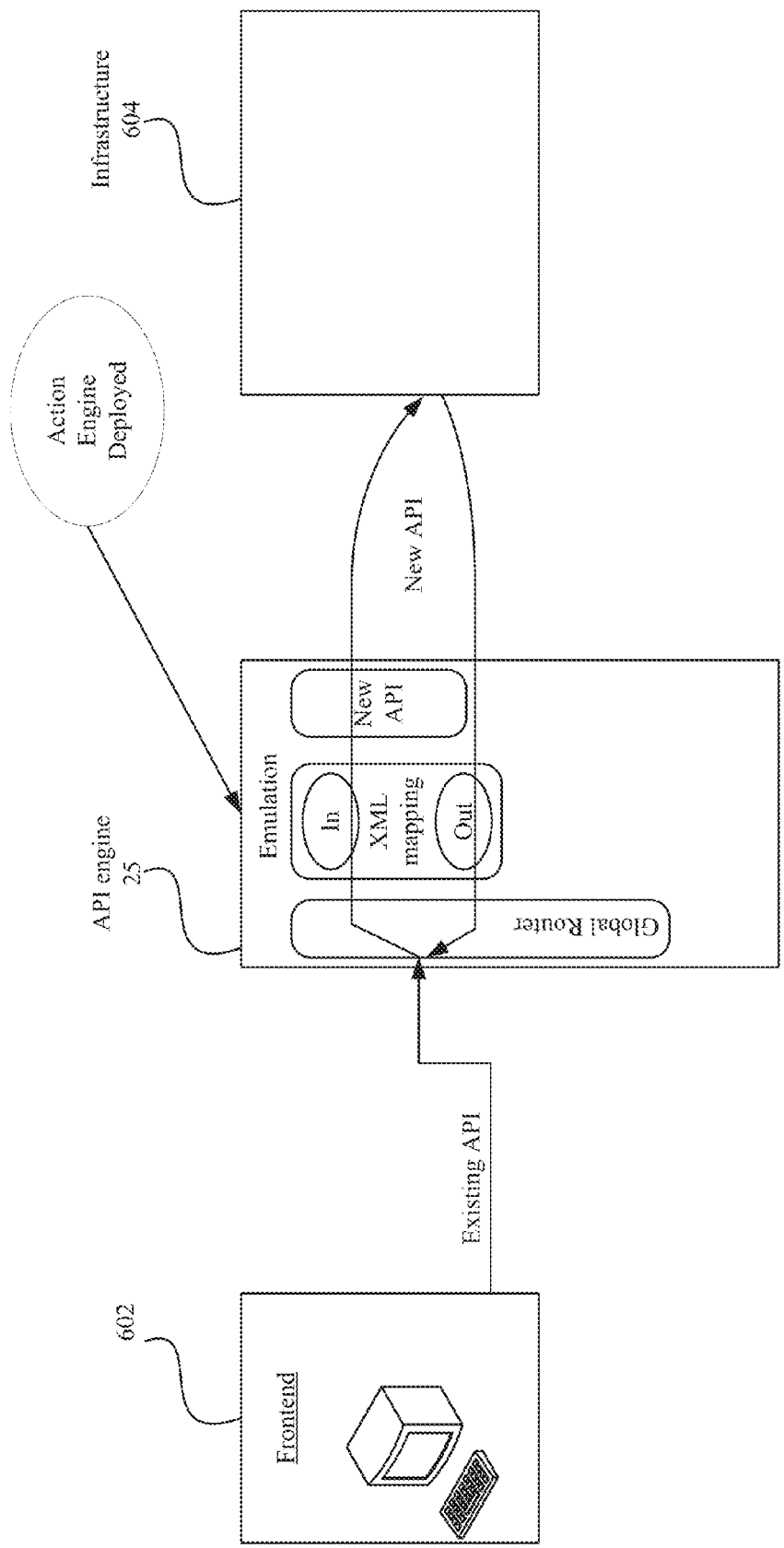
FIG. 6 illustrates an exemplary deployment of an API engine.

FIG. 6 illustrates an exemplary deployment of an API engine. FIG. 6 illustrates a front end 602, the API engine 25 and infrastructure 604. The front end may be computing device 27 and/or mobile station 13a or 13b. In some implementations, the API engine 25 may include a global router and an XML mapping component. The global router may route API calls from front end 602 to the a new or modified API via the XML mapping component. Calls based on the new API may be provided to the infrastructure 604. The new API may be configured to interface with the components of infrastructure 604. The components may include, but are not limited to, one or more servers, computing devices and databases.

Figure 7:
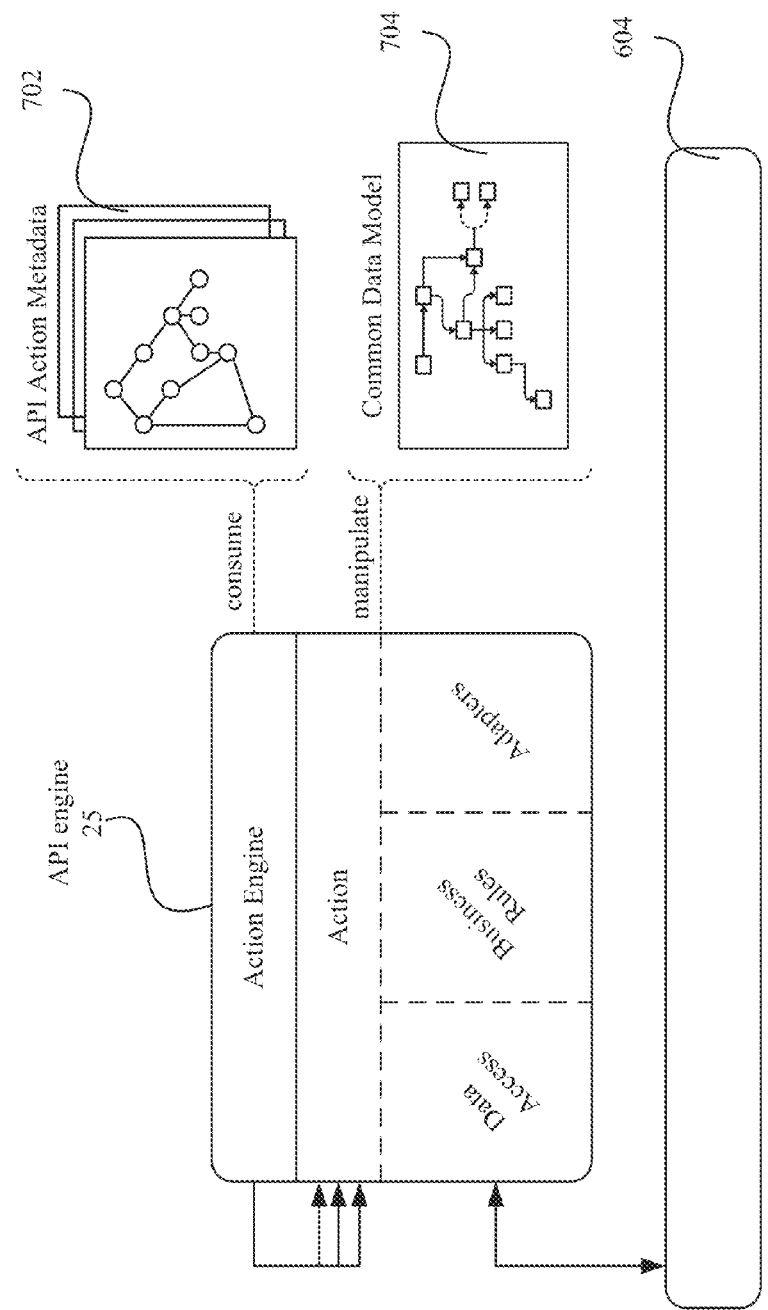
FIG. 7 illustrates exemplary relationships between an API engine and other components.

FIG. 7 illustrates exemplary relationships between the API engine 25 and other components in the API development framework in accordance with the implementations described above. For example, API engine 25 may include one or more of data access rules, business rules and data adapters. API engine 25 may consume or interface with API action metadata. The API action metadata may be stored as a data structure. The API action metadata may include one or more attributes or values associated with APIs. The API engine 25 may also manipulate a common data model. The common data model standardizes the format and content of API related data, so that standardized applications, tools and methods can be applied to the data.

Figure 8:
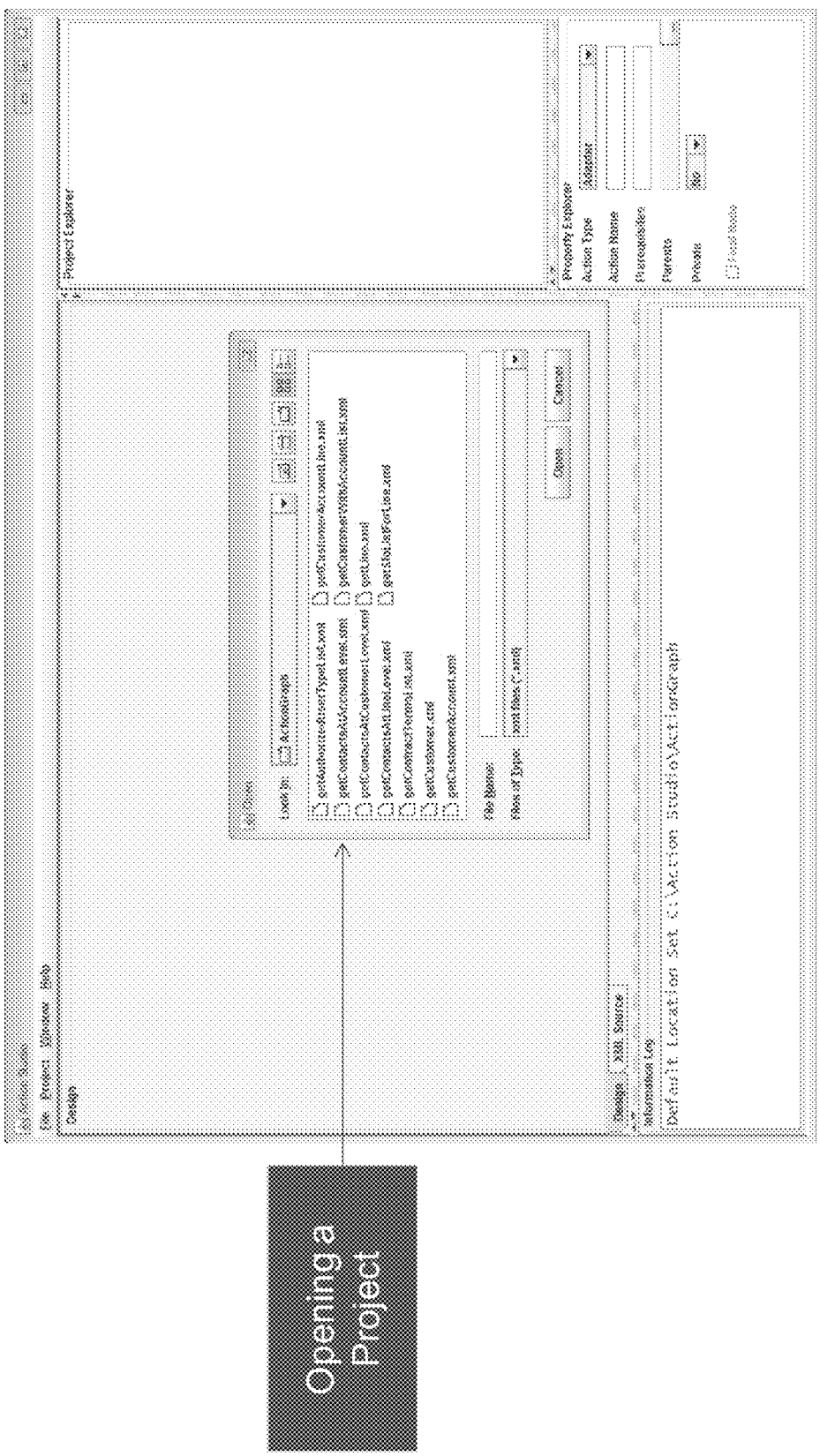
FIG. 8 illustrates an exemplary operation to open an API project.

FIG. 8 illustrates an exemplary operation to open an API project. An API project may be a software project in which an API that is being created may be saved (e.g., saved to storage or memory). A user may select this menu to open an existing API project (e.g., "getLine.xml") via the user interface 19. Once opened, the user may graphically edit the API project using the graphical workspace illustrated in FIG. 4.

Figure 9:
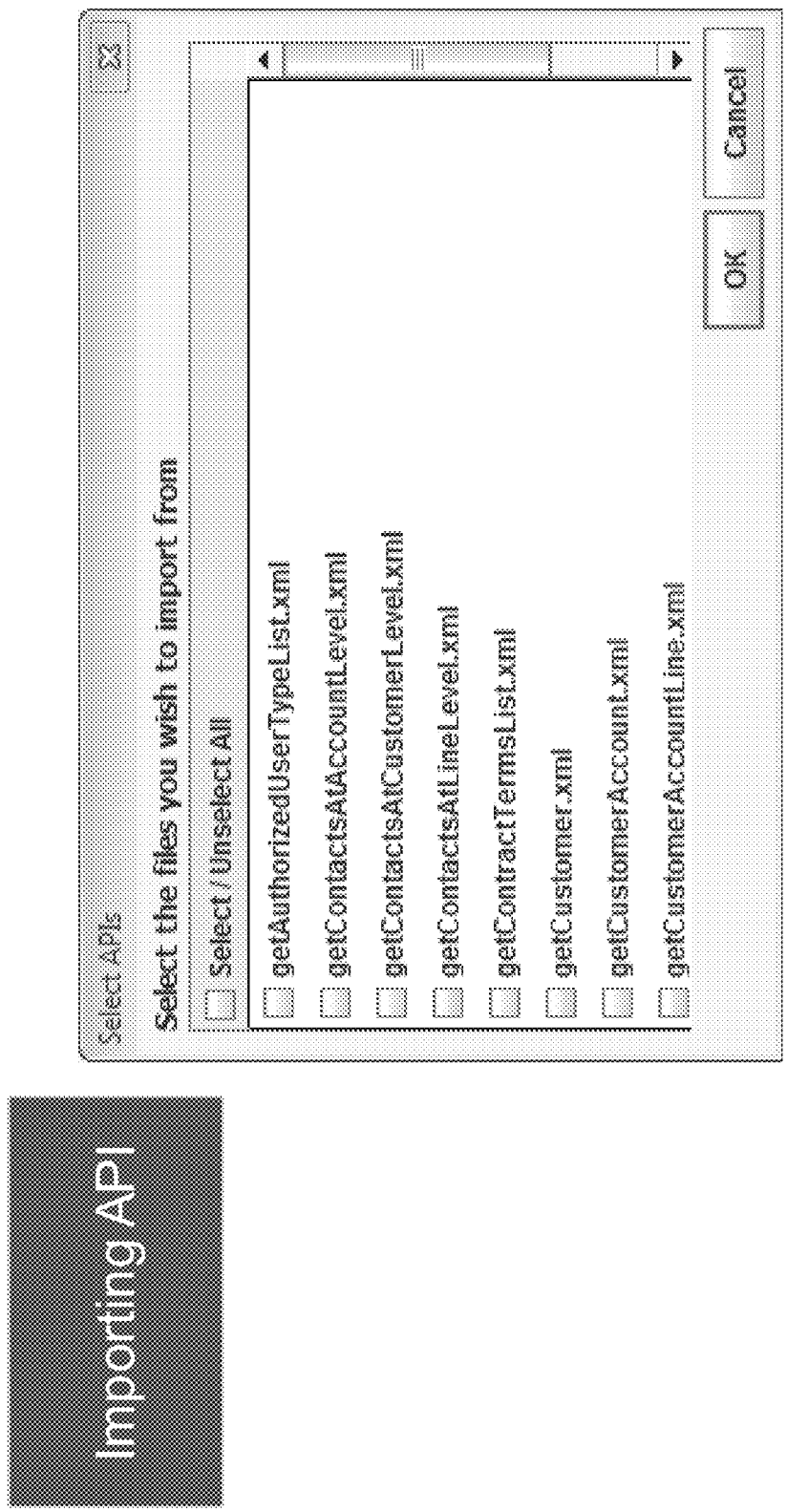
FIG. 9 illustrates an exemplary operation to import an API into an API project.

FIG. 9 illustrates an exemplary operation to import an API into an API project. A user may select this menu to import an API (e.g., "getCustomer.xml") into an existing API project via the user interface 19. Once imported, the user may graphically edit the API project using the graphical workspace illustrated in FIG. 4.

FIG. 10 illustrates an exemplary operation to import an action into an API project. A user may select this menu to import a particular programming action (e.g., "CheckAttributesForAccount") into an existing API project via the user interface 19. Once imported, the user may graphically edit the API project using the graphical workspace illustrated in FIG. 4.

FIG. 11 illustrates an exemplary operation to add an action into an API project. A user may select this menu to add a particular programming action (e.g., "Adapter, Business Rule, etc.") into an existing API project via the user interface 19. Once opened, the user may graphically edit the API project using the graphical workspace illustrated in FIG. 4.

Figures 12, 13:
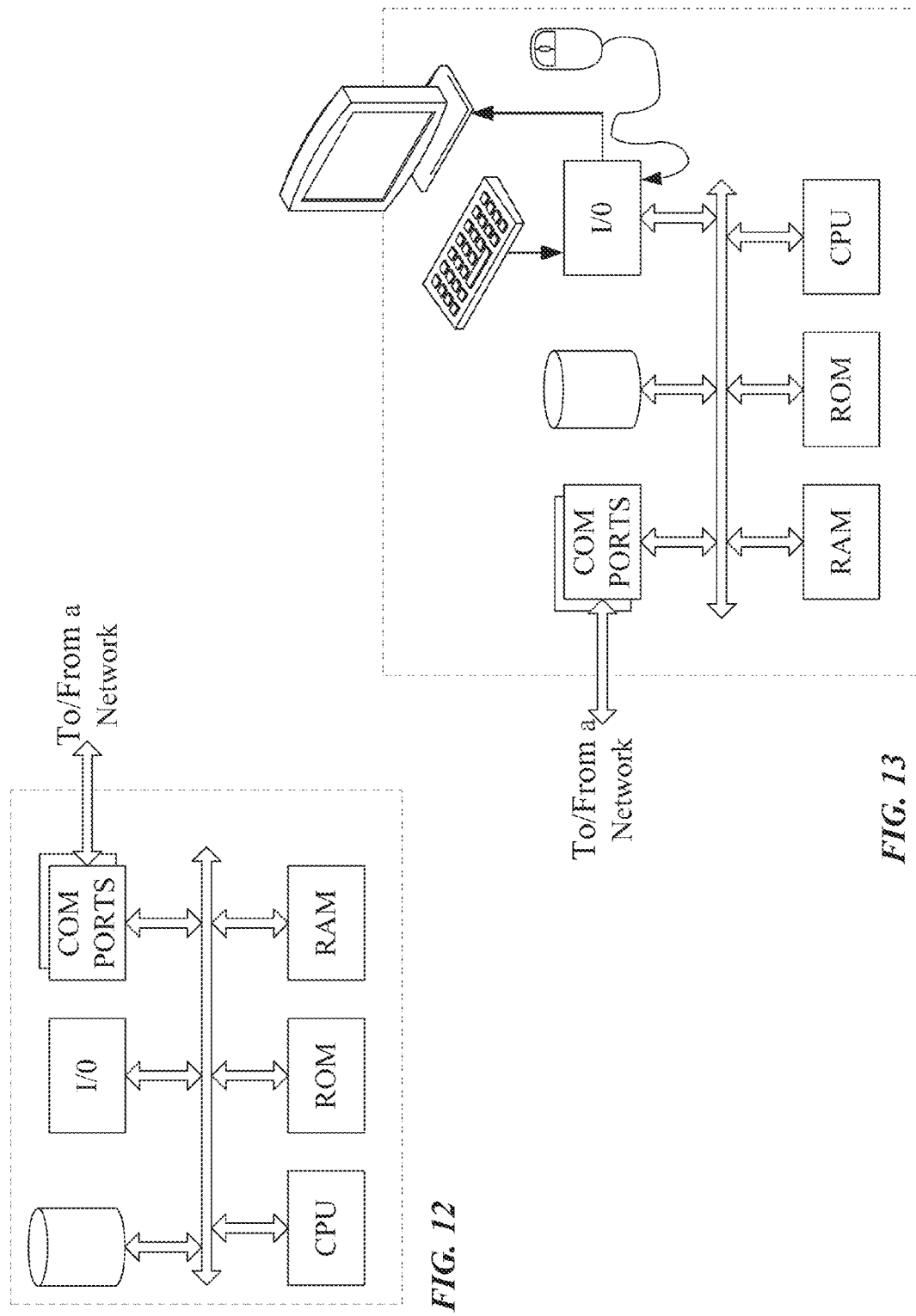
FIG. 12 illustrates a simplified functional block diagram of a computer that may be configured as a host or server, for example, to function as the API engine in the system of FIG. 1.
FIG. 13 illustrates a simplified functional block diagram of a personal computer or other work station or terminal device.

FIGS. 12 and 13 provide functional block diagram illustrations of general purpose computer hardware platforms. FIG. 12 illustrates a network or host computer platform, as may typically be used to implement a server. FIG. 13 depicts a computer with user interface elements, as may be used to implement a personal computer or other type of work station or terminal device, although the computer of FIG. 13 may also act as a server if appropriately programmed. For example, the computer and platforms illustrated in FIG. 12 and FIG. 13 may be implemented as the API action engine 25. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 13). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of the API development framework outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the API development framework into the computer platform of the API engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the API engine, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, via a user interface of a processor-based system, a selection of a first graphical element representing a first component of an application programming interface (API) that is to be generated, wherein the first component is associated with a first set of one or more reusable programming actions;
receiving instructions, via the user interface of the processor-based system, to drag the selected first graphical element to a graphical workspace associated with the user interface;
receiving, via the user interface of the processor-based system via, a selection of a second graphical element representing a second component of the API, wherein the second component is associated with a second set of one or more reusable programming actions;
receiving instructions, via the user interface of the processor-based system, to drag the selected second graphical element and connect the selected second graphical element with the first graphical component on the graphical workspace;
combining the first set of reusable programming actions with the second set of reusable programming actions when the selected second graphical element is connected with the first graphical component on the graphical workspace;
upon the combining, automatically displaying software code representing the API, wherein the software code is embedded in one or more software applications to perform the first set and the second set of the one or more reusable programming actions;
generating an action dependency graph representing the combined first set of reusable programming actions and the second set of reusable programming actions;
transforming extensible markup language (XML) of the action dependency graph into an action graph object; and
iterating through each action in the action graph object to build indexes required to satisfy one or more queries.

2. The method of claim 1, wherein the first graphical element and the second graphical element are connected in parallel to perform the first set and the second set of the one or more reusable programming actions in parallel.

3. The method of claim 1, further comprising:
parsing the first graphical component representing the first set of reusable programming actions and the second graphical component representing the second set of reusable programming actions as a dependency graph of actions; and
executing the actions starting with actions that have no dependencies, until all actions are complete or a fatal error occurs.

4. The method of claim 3, further comprising:
storing information about the status and data shared between the first set of reusable programming actions and the second set of reusable programming actions.

5. The method of claim 1, further comprising:
allowing another set of reusable programming actions to reference the first graphical component representing first set of reusable programming actions or the second graphical component representing the second set of reusable programming actions.

6. The method of claim 1, further comprising:
introducing one or more conditions via the first set of reusable programming actions or the second set of reusable programming actions, wherein the conditions include flags that can be used at runtime to determine if an action is eligible for execution.

7. The method of claim 1, further comprising:
adding the first graphical element and the second graphical element to the workspace with a service name as a key.

8. The method of claim 1, wherein the queries include one or more of:

retrieving fully qualified action class name from a particular action's name;
retrieving the particular action's children; and
retrieving the particular action's parents.

9. The method of claim 1, further comprising:
rejecting the action dependency graph at startup when it is determined that the graph is invalid or contains ambiguities, wherein the ambiguities include one or more of:
  inability to locate a class matching a fully qualified class name assembled from the action dependency graph;
  inclusion of identifiers in the action dependency graph that deviate from configured naming conventions; and
  a parentless action in the action dependency graph.

10. The method of claim 1, further comprising:
providing a copy of a parent connection map to each action in the combined first set of reusable programming actions and the second set of reusable programming actions;
when n actions have the same parent, creating n−1 copies of connections to the parent so that each action can have a separate parent connection map; and
when an action has multiple parents, combining connection maps from the multiple parents into one map.

11. An application programming interface (API) engine comprising:
a communication interface configured to enable communication via a mobile network;
a processor coupled with the communication interface;
a storage device accessible to the processor; and
an executable program in the storage device, wherein execution of the program by the processor configures the API engine to perform functions, including functions to:
  receive, via a user interface of a processor-based system, a selection of a first graphical element representing a first component of an application programming interface (API) that is to be generated, wherein the first component is associated with a first set of one or more reusable programming actions;
  receive, via the user interface of the processor-based system, instructions to drag the selected first graphical element to a graphical workspace associated with the user interface;
  receive, via the user interface of the processor-based system via, a selection of a second graphical element representing a second component of the API, wherein the second component is associated with a second set of one or more reusable programming actions;
  receive, via the user interface of the processor-based system, instructions to drag the selected second graphical element and connect the selected second graphical element with the first graphical component on the graphical workspace;
  combine the first set of reusable programming actions with the second set of reusable programming actions when the selected second graphical element is connected with the first graphical component on the graphical workspace;
  upon the combination, automatically display software code representing the API, wherein the software code is embedded in one or more software applications to perform the first set and the second set of the one or more reusable programming actions;
  generate an action dependency graph representing the combined first set of reusable programming actions and the second set of reusable programming actions;
  transform extensible markup language (XML) of the action dependency graph into an action graph object; and
  iterate through each action in the action graph object to build indexes required to satisfy one or more queries.

12. The API engine of claim 11, wherein the first graphical element and the second graphical element are connected in parallel to perform the first set and the second set of the one or more reusable programming actions in parallel.

13. The API engine of claim 11, wherein execution of the program by the processor configures the API engine to perform functions, including functions to:
  parse the first graphical component representing the first set of reusable programming actions and the second graphical component representing the second set of reusable programming actions as a dependency graph of actions; and
  execute the actions starting with actions that have no dependencies, until all actions are complete or a fatal error occurs.

14. The API engine of claim 13, wherein execution of the program by the processor configures the API engine to perform functions, including functions to
  store information about the status and data shared between the first set of reusable programming actions and the second set of reusable programming actions.

15. The API engine of claim 11, wherein execution of the program by the processor configures the API engine to perform functions, including functions to:
  allow another set of reusable programming actions to reference the first graphical component representing first set of reusable programming actions or the second graphical component representing the second set of reusable programming actions.

16. The API engine of claim 11, wherein execution of the program by the processor configures the API engine to perform functions, including functions to:
  introduce one or more conditions via the first set of reusable programming actions or the second set of reusable programming actions, wherein the conditions include flags that can be used at runtime to determine if an action is eligible for execution.

17. The API engine of claim 11, wherein execution of the program by the processor configures the API engine to perform functions, including functions to:
  add the first graphical element and the second graphical element to the workspace with a service name as a key.

18. The API engine of claim 11, wherein the queries include one or more of:
  retrieving fully qualified action class name from a particular action's name;
  retrieving the particular action's children; and
  retrieving the particular action's parents.

19. The API engine of claim 11, wherein execution of the program by the processor configures the API engine to perform functions, including functions to:
  reject the action dependency graph at startup when it is determined that the graph is invalid or contains ambiguities, wherein the ambiguities include one or more of:
    inability to locate a class matching a fully qualified class name assembled from the action dependency graph;

inclusion of identifiers in the action dependency graph that deviate from configured naming conventions; and a parentless action in the action dependency graph.

20. A non-transitory computer-readable medium comprising instructions which, when executed by one or more computers, cause the one or more computers to:

receive, via a user interface of a processor-based system, a selection of a first graphical element representing a first component of an application programming interface (API) that is to be generated, wherein the first component is associated with a first set of one or more reusable programming actions;

receive, via the user interface of the processor-based system, instructions to drag the selected first graphical element to a graphical workspace associated with the user interface;

receive, via the user interface of the processor-based system via, a selection of a second graphical element representing a second component of the API, wherein the second component is associated with a second set of one or more reusable programming actions;

receive, via the user interface of the processor-based system, instructions to drag the selected second graphical element and connect the selected second graphical element with the first graphical component on the graphical workspace; and combine the first set of reusable programming actions with the second set of reusable programming actions when the selected second graphical element is connected with the first graphical component on the graphical workspace;

upon the combination, automatically display software code representing the API, wherein the software code is embedded in one or more software applications to perform the first set and the second set of the one or more reusable programming actions;

generate an action dependency graph representing the combined first set of reusable programming actions and the second set of reusable programming actions;

transform extensible markup language (XML) of the action dependency graph into an action graph object; and iterate through each action in the action graph object to build indexes required to satisfy one or more queries.

* * * * *